May 17, 1927.
C. E. MORRIS
1,628,733
FAUCET BULB CONNECTION
Filed Jan. 28, 1927
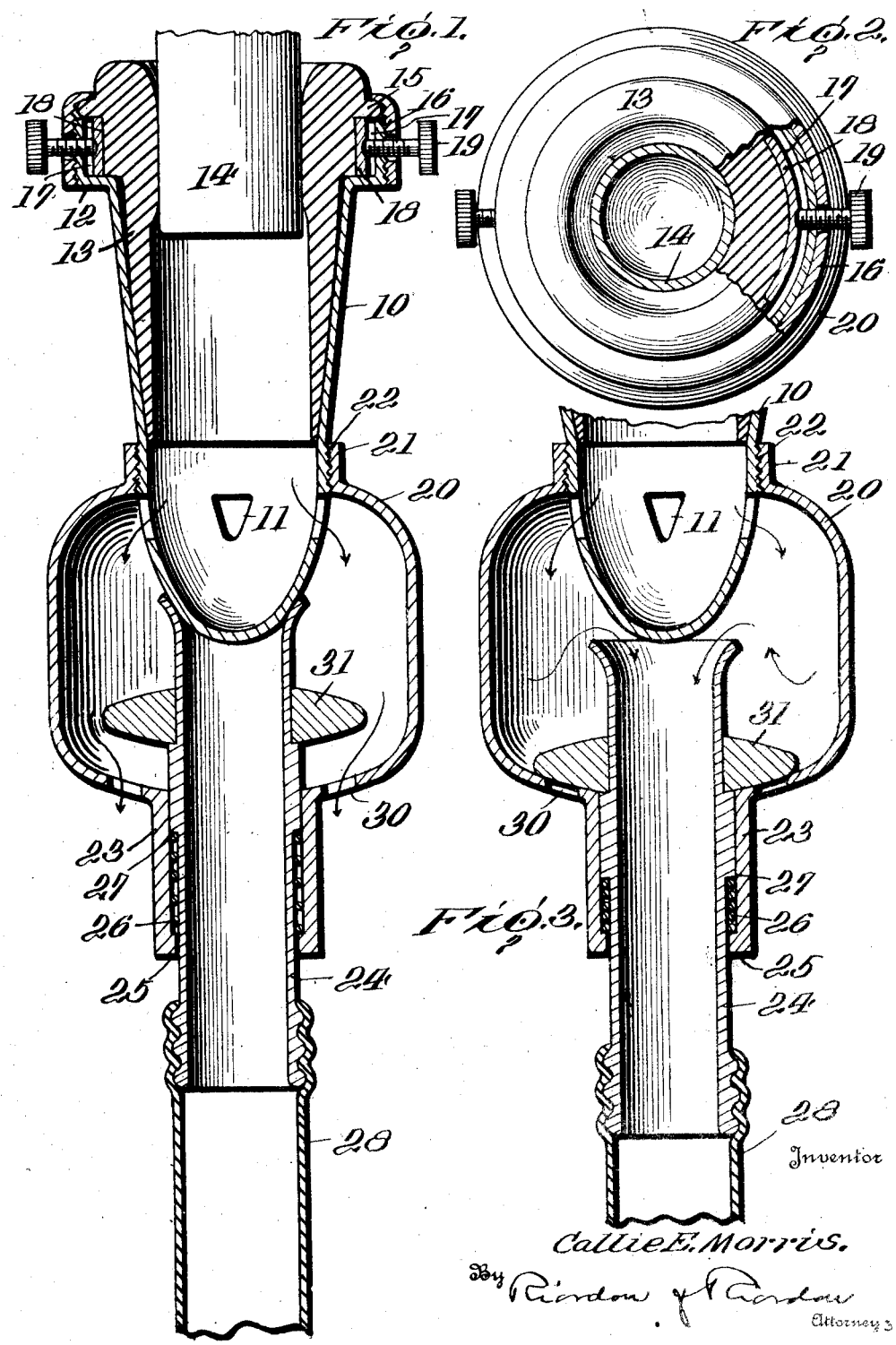
Inventor
Callie E. Morris.
By Rindow y Rindow
Attorneys Patented May 17, 1927.

1,628,733

UNITED STATES PATENT OFFICE.

CALLIE E. MORRIS, OF BROOKLYN, NEW YORK.

FAUCET-BULB CONNECTION.

Application filed January 28, 1927. Serial No. 164,287.

This invention relates to an improvement in hose connection for faucets, and employed in connection with shower sprays, syringes and like uses.

The invention consists of certain novel features of construction and combination of parts which will be hereinafter described and pointed out in the claims.

In the accompanying drawings:—

Figure 1 is a vertical sectional view;

Figure 2 is a top plan view partly in section illustrating the manner of clamping the device to a faucet; and Figure 3 is a vertical sectional view similar to Figure 1, showing the hose tube in position for discharging the water therethrough.

A tubular metal housing 10, is closed at its lower end and provided in the wall thereof, adjacent the lower end, with a plurality of outlet openings 11. The other end of the housing is bent outwardly and then upwardly producing an annular shoulder 12. Fitted within the housing 10, is a tubular gasket 13, adapted to be forced over the end of a spigot 14. The gasket is provided with an annular flange 15, which is seated on the shoulder 12 and engaging the upper edge of this flange is a ring 16 which has screw-threaded engagement with the upper end of the housing 10, for fastening the gasket to the housing. This flange 15 of the gasket is provided with recesses 17 for the reception of plates 18, engaged by the ends of thumb screws 19 having screw threaded engagement with the upper edge of the housing 10, for compressing the gasket into contact with the spigot 14 and thereby insuring a snug tightly fitting connection between the housing and spigot.

An annular casing or receiving chamber 20 is provided at one end with an internally screw threaded nipple 21, which has engagement with screw threads 22, formed on the exterior of the housing 10, above the outlet openings 11, for attaching the casing to the housing. The casing 20, is provided at its lower end with a tubular extension 23, in which is mounted a tube or pipe 24, which projects into the casing 20 and has a flaring upper end adapted to be normally seated against the lower end of the housing 10 for closing the pipe 24.

The lower end of the tubular extension 23 has an inturned flange 25 which forms a seat for a coil spring 26, interposed between the pipe 24 and the tubular extension, the upper terminal of the spring 26 engaging a shoulder 27 on the pipe 24. The spring 26 normally exerts pressure for causing the pipe 24, to be seated against the lower end of the casing 10 and preventing the ingress of water to the pipe. The lower or outer end of the pipe 24, is connected to a hose 28, leading to a spray head, syringe, or the like. The base of the casing 20 is provided with openings 30 through which the water may be discharged from the casing.

Mounted upon the pipe 24, within the receiving chamber or casing 20, is an annular valve 31, which is adapted to close the openings 30 of the receiving chamber when the pipe 24, is drawn outwardly as indicated in Figure 3, and when the pipe is in this position, the openings 30 being closed by the valve 31, the water entering the receiving chamber from the housing 10 will flow from the receiving chamber into the pipe 24 and from this pipe through the hose 28.

From the foregoing it will be observed that with this device the supply of water to the hose 28 of the irrigating apparatus may be regulated or governed by the force exerted upon the hose in overcoming the tension of the spring 26. That is, when the operator desires a supply of water through the hose he exerts a pull upon the hose to overcome the tension of the spring 26 causing pipe 24 to be drawn outwardly through the receiving chamber 20 and thereby moving valve 31 to close the outlet openings 30, of the receiving chamber and thereby diverting the flow of water through the openings 30 into the pipe 24 from which the water will be conveyed to the hose 28. Upon the release of this force or pull upon the hose 28 the spring 26 immediately causes the pipe 24 to be projected into the casing 20 and the upper end of the pipe 24, to be seated against the lower end of the housing 10, and prevent the ingress of water to the pipe 24 and at the same time elevates the valve 31, thereby uncovering the outlet openings 30 whereby water entering the receiving chamber 20 will be discharged through the openings 30 into the tub or basin.

Having thus described my invention, what I claim as new and desire to secure by Letters Patent of the United States is:

1. The combination of a housing for connection with a spigot having a closed lower end and lateral discharge openings, a receiving chamber mounted upon the housing and provided with outlet openings in the base thereof, a pipe slidably mounted within the receiving chamber through which liquid in the receiving chamber may be discharged, a valve carried by said pipe for closing the outlet openings of the receiving chamber, said pipe adapted to be projected into the receiving chamber and into engagement with the lower end of the housing for preventing the ingress of liquid to the pipe and for unseating the valve carried thereby.

2. The combination of a housing for connection with a spigot having a closed lower end and discharge openings therein, a receiving chamber mounted upon the housing and provided with outlet openings in its base, a pipe to which a hose is connected, slidably mounted in the receiving chamber, means for normally projecting the pipe into the receiving chamber and causing the end of the pipe to engage the housing for closing the pipe, and a valve carried by the pipe for closing the outlet openings of the receiving chamber when the pipe is moved to a position for permitting the liquid in the receiving chamber to pass therethrough.

3. The combination of a housing for connection with a spigot having a discharge opening at its lower end, a gasket mounted within the housing for engaging the spigot, means carried by the housing for compressing the gasket into engagement with the spigot, a receiving chamber mounted upon the housing and provided with outlet openings in its base, a pipe slidably mounted in the receiving chamber and a valve carried by said pipe for closing the outlet openings of the receiving chamber.

4. The combination of a housing for connection with a spigot, a receiving chamber mounted upon the housing, said housing provided with an outlet into said chamber and said receiving chamber provided with outlet openings in the base thereof, a pipe slidably mounted within the receiving chamber through which liquid in the receiving chamber may be discharged, a valve carried by said pipe for closing the outlet openings of the receiving chamber, said pipe adapted to be projected into the casing and into engagement with the lower end of the housing for preventing the ingress of liquid to the pipe and for unseating the valve carried thereby.

In testimony whereof I hereunto affix my signature.

CALLIE E. MORRIS.